United States Patent [19]

Knechtges et al.

[11] 4,002,801
[45] Jan. 11, 1977

[54] HEAT SEALABLE ARTICLES TREATED WITH VINYL HALIDE POLYMER LATICES

[75] Inventors: Donald P. Knechtges, Grafton; Bela K. Mikofalvy, Avon Lake, both of Ohio

[73] Assignee: The B.F. Goodrich Company, Akron, Ohio

[22] Filed: Jan. 15, 1975

[21] Appl. No.: 541,133

Related U.S. Application Data

[63] Continuation of Ser. No. 341,996, March 16, 1973, abandoned.

[52] U.S. Cl. .................. 428/474; 428/455; 428/461; 428/462; 428/463; 428/514; 428/517; 428/519; 428/520; 428/540; 428/515; 428/518; 428/395; 428/510; 260/29.6 RW; 260/2.5 R; 260/881; 260/883; 427/45; 156/273
[51] Int. Cl.$^2$ .................. B32B 27/06; B32B 27/34
[58] Field of Search .......................... 161/249, 253; 260/29.6 RW, 2.5, 881, 883; 117/93.1 DH, 161 UF; 428/500, 510, 474, 514–520, 462, 463, 461, 540; 427/45

[56] References Cited
UNITED STATES PATENTS

| | | | |
|---|---|---|---|
| 3,297,613 | 1/1967 | Gibbs | 260/883 X |
| 3,351,602 | 11/1967 | Dunnavant et al. | 260/881 X |
| 3,424,706 | 1/1969 | Smith et al. | 260/29.6 RW |
| 3,632,562 | 1/1972 | Beier et al. | 260/29.6 RW X |
| 3,740,257 | 6/1973 | Roscher | 117/93.1 DH |
| 3,839,081 | 10/1974 | Tanahashi et al. | 260/881 X |
| 3,850,726 | 11/1974 | Smith et al. | 117/161 UF X |
| 3,862,077 | 1/1975 | Schulz et al. | 260/881 X |
| 3,868,433 | 2/1975 | Bartz et al. | 161/247 X |

*Primary Examiner*—P. C. Ives
*Attorney, Agent, or Firm*—Roy P. Wymbs

[57] ABSTRACT

Strong heat-sealable nonwoven fabrics, textiles, papers and other substrates which have been treated with a polymer latex derived predominantly from polymers of vinyl halides or vinylidene halides which have been overpolymerized with one or more of $\alpha,\beta$-olefinically unsaturated carboxylic acids, olefinically unsaturated amides or their N-alkylol and N-alkoxyalkyl derivatives, and esters of acrylic and methacrylic acids. Copolymers of vinyl halide or vinylidene halide with vinylidene monomers containing a terminal $CH_2=C<$ group may also be overpolymerized in the same way in making the heat sealable articles.

8 Claims, No Drawings

HEAT SEALABLE ARTICLES TREATED WITH VINYL HALIDE POLYMER LATICES

CROSS REFERENCE TO RELATED APPLICATION

This application is a continuation of our application Ser. No. 341,996, filed Mar. 16, 1973, now abandoned.

BACKGROUND OF THE INVENTION

Various synthetic polymer latices derived from acrylic esters can be made self-curing. That is, they are capable of being cured at elevated temperatures without the necessity of adding curing agents externally. These acrylic ester polymers are useful for many applications where articles, such as nonwoven fabrics, textiles, papers, or other substrates, are coated, impregnated, or otherwise saturated with an aqueous dispersion of the polymer. These latices contain reactivity in the polymer obtained by the polymerization of a minor proportion of one or more reactive monomoers with the acrylic ester monomer. These self-compositions, capable of being cured by heat, have a long shelf life in the uncured state.

However, one disadvantage of these self-curing compositions is that they must necessarily be heated at temperatures of about 300° F. or 325° F. to obtain acceptable cures and optimum physical properties. It would be advantageous to have articles, such as nonwovens, textiles, and paper treated with self-curing polymer latices which are capable of being cured at temperatures below about 300° F. to obtain optimum or near optimum physical properties with minimum discoloration and with good heat sealability to enable the fabrication of finished articles cheaply, that is, without expensive stitching and like operations. These articles could be produced at much faster rates and more economically due to lower heat requirements.

It would be highly advantageous to obtain vinyl halide and vinylidene halide polymer latices which are self-curing and capable of being heat sealed after curing. Heretofore, it has been difficult to introduce the necessary reactivity into vinyl halide and vinylidene halide polymers since the reactive monomers conventionally employed are not, under the usual emulsion polymerization conditions, compatible with the polymerization of vinyl halide or vinylidene halide. This is due to the markedly different reactivity ratio of these reactive monomers to that of the vinyl halide and vinylidene halide monomers. Introducing such reactive monomers with vinyl chloride, for example, would normally shortstop the polymerization or at least inhibit the polymerization so as to make it impracticable.

In the case of acrylate and nitrile latices the self-curing mechanism is incorporated by copolymerizing an $\alpha\beta$-olefinically unsaturated carboxylic acid and an olefinically unsaturated amide or its N-alkylol derivatives with the acrylate or nitrile. However, the amide derivatives do not readily copolymerize with vinyl and vinylidene halides. It would be advantageous to incorporate such a curing mechanism in vinyl halide and vinylidene halide polymers because such polymers would make superior heat seal adhesives for use in substrates, particularly in the automotive industry, since they are harder polymers.

SUMMARY OF THE INVENTION

We have unexpectedly found that by coating, saturating or impregnating nonwoven fabrics, textiles, papers and other substrates with certain polymer latices derived predominantly from vinyl halide or vinylidene halide, the so treated articles have improved and superior heat sealable properties, particularly in the case of dielectric heat sealing. Also, the substrates are capable of being cured at temperatures well below 300° F. This unexpected result was achieved by overpolymerizing various reactive monomers on to the polymer of the vinyl halide or vinylidene halide, or copolymers thereof with one or more monomers containing a terminal $CH_2=C<$ group. In this way polymer latices are produced having the necessary reactivity incorporated therein which imparts the unexpected properties to the substrates.

The overpolymer latices useful in the practice of the present invention are those wherein the basic polymer or core or seed polymer is a homopolymer of a vinyl halide or vinylidene halide monomer, or copolymers thereof containing from about 5% to 99.9% by weight, based on the total monomers, of the vinyl halide or vinylidene halide, and up to about 94.8% by weight of one or more other polymerizable comonomers. The core polymer will comprise from about 10% to 90% by weight of the overpolymerized polymer latex. The core polymer has overpolymerized thereon one or more monomers selected from the group of $\alpha\beta$— olefinically unsaturated carboxylic acids, olefinically unsaturated amides derived from $\alpha,\beta$— olefinically unsaturated carboxylic acids, the N-alkylol and N-alkoxyalkyl derivatives of said olefinically unsaturated amides, and esters of acrylic and methacrylic acids. The overpolymerized portion of the polymer latex is referred to as the shell and will comprise from about 90% to 10% by weight of the overpolymerized polymer latex.

DETAILED DESCRIPTION

The substrates or articles of this invention are saturated, coated or impregnated with the overpolymerized vinyl halide or vinylidene halide latex polymers to give the superior heat sealable articles. Further, the articles are capable of being cured by heating at temperatures substantially lower than 300° F. and often as low as room temperature without the use of external curing agents. Curing at such low temperatures results in little or no discoloring of the articles but more importantly, the curing step has little or no effect on the heat sealable properties of the articles.

After having been saturated, coated or impregnated with the polymer latex, the articles are then capable of being heat sealed to itself or to other materials such as textile fabrics, papers, fiberboard, plastic materials, such as films, and the like, etc. While various known methods of heat sealing may be employed, such as heated metal platens, and the like, the articles are particularly adapted for use with dielectric heat sealing methods, especially in those operations where costly stitching would ordinarily have to be employed. For example, in the automotive industry dielectric heat sealing is used in the interiors of automobiles on upholstery and door panels, etc. Superior strength seals are obtained with the articles of this invention by comparison to known polymer latex treated substrates presently in use commercially, as will be seen from the specific examples hereinafter.

Among the substrates which may be used to form the heat sealable articles of this invention are papers, nonwoven fabrics, textiles, and the like. Suitable papers which may be treated with the polymer latices are those obtained from any bleached or unbleached pulp process or from the unbleached sulfite, bleached sulfite, unbleached sulfate, semi-bleached and bleached sulfate processes. A wide variety of nonwoven and textile materials may be used as substrates herein, such as those derived from natural fibers, such as cotton, wool, silk, and the like; from artificial fibers, such as viscose rayon, acetate rayon, and other cellulose esters; from proteinaceous fibers such as those derived from casein; from synthetic fibers such as those derived from the condensation of adipic acid and hexamethylene diamine (nylon 66) or from the self-condensation of caprolactone (nylon 6); polyesters such as polyethylene terephthalate; olefins such as polyethylene and polypropylene; acrylic and modacrylic fibers from polymerized acrylonitrile or copolymers of acrylonitrile with one or more mono-olefinic monomers copolymerizable therewith, such as vinyl acetate, vinyl chloride, methyl acrylate, methyl methacrylate, and the like; from copolymers of vinyl chloride with vinyl acetate or vinylidene chloride; or the like. Other widely divergent substrates, such as metals, wood, leather and poromeric materials, plastics, foams, cork, and the like, may also be employed in making the articles of the present invention.

The papers, textiles, nonwovens and other substrates used in this invention can be those made by any of the well known techniques. For example, papers can be formed by moving a fine wire screen from an aqueous suspension of the cellulosic fibers. Nonwovens can be obtained by carding, deposition of the fibers from an air stream, deposition from solution, wet layering, or the like, depending upon the fiber or fiber blend being used and whether or not the fibers are to be randomly distributed or aligned in any one direction.

The commonly known techniques are employed in the treatment of the substrate with the polymer latices. For example, when impregnating or saturating the substrate, it may be dipped or sprayed and if the substrate is to be coated, it may be accomplished by dipping, spraying or by employing a roller, spreading knife, brush, or the like.

The vinyl halide and vinylidine halide overpolymer latices used in making the heat sealable articles of this invention may be compounded with, or have mixed therein, other known ingredients, such as fillers, plasticizers, antioxidants or stabilizers, antifoaming agents, dyeing adjuvants, pigments, or other compounding aids. Further, thickeners or bodying agents may be added to the polymer latices so as to control the viscosity of the latices and thereby achieve the proper flow properties for the particular application desired. Usually the polymer latices, when applied to the substrates, will contain from about 5% to about 50% or higher total solids.

The polymer latices useful for the present invention are obtained by the overpolymerization of a core polymer or copolymer of a vinyl halide or a vinylidene halide monomer (hereinafter simply referred to as vinyl halide monomers) having the following structural formula:

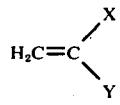

wherein X is a halogen selected from the group consisting of chlorine, bromine and fluorine and Y is hydrogen or a halogen as defined for X. Especially useful vinyl halide monomers of the above type are vinyl chloride and vinylidene chloride and they may be employed individually or in combination. When copolymerized, the amount of vinyl halide monomer(s) in the core polymer will range from about 5% to about 90% by weight of the total monomer composition.

Monomers which may be copolymerized with the vinyl halide monomers are various monomers containing a polymerizable double bond such as, for example, conjugated dienes, such as butadiene and isoprene; $\alpha$— olefins such as ethylene, propylene, isobutylene, butene-1, and the like; vinyl acetate, vinyl aromatics such as styrene, chlorostyrene, $\alpha$— methyl styrene, and the like; alkyl vinyl ethers such as methyl vinyl ether or isobutyl vinyl ether; $\alpha\beta$— olefinically unsaturated nitriles such as acrylonitrile or methacrylonitrile and cyanoalkyl acrylates; acrylamide, methacrylamide, diacetone acrylamide, N-octyl acrylamide, and the like; bis ($\beta$-chloroethyl) vinyl phosphonate; polyfunctional monomers such as methylenebisacrylamide, ethyleneglycol dimethacrylate, diethyleneglycol diacrylate, divinylbenzene, allyl pentaerythritol, and the like. When the polymerizable comonomer is used, it is present in amount up to about 94.8% by weight of the total monomer composition.

The shell of the overpolymerized polymer latices is formed by polymerizing onto the vinyl halide or vinylidene halide core polymer or copolymer one or more polymerizable monomers of $\alpha\beta$— olefinically unsaturated carboxylic acids, amides derived from $\alpha,\beta$— olefinically unsaturated carboxylic acids and their N-alkylol and N-alkoxyalkyl derivatives, acrylic and methacrylic acids and esters derived therefrom. The selection of shell monomers depends upon the final properties desired in the substrate and its end use. The flow characteristics desired in the finished polymer latex will also influence the choice of shell monomers. The selection of shell monomers need not come from all the groups of monomers for any one polymer latex but some instances may come from only one or two groups. However, in order to obtain the proper reactivity in the overpolymer, at least one of the monomers chosen for the shell should be an N-alkylol or N-alkoxyalkyl derivative of an amide. For example, an excellent overpolymerized polymer latex is obtained when the reactive shell monomers acrylamide and N-methanol acrylamide are employed.

The $\alpha,\beta$— olefinically unsaturated carboxylic acids which are overpolymerized on the vinyl halide and vinylidene halide polymers are those containing at least one carbon-carbon double bond and at least one carboxyl group and containing from 2 to 12 carbon atoms. Especially useful acids, because of their ready availability and ease of polymerization, are those having a double bond in the $\alpha,\beta$— position with respect to the carboxyl group

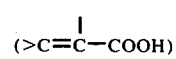

or with a terminal methylene grouping ($H_2C = C<$). Typical monomers include acrylic acid, methacrylic acid, ethacrylic acid, $\alpha$— chloroacrylic acid, $\alpha$— cyanoacrylic acid, crotonic acid, $\beta$ — acryloxy propionic acid, hydrosorbic acid, sorbic acid, α— chlorosorbic acid, cinnamic acid, β— styryl acrylic acid, hydromuconic acid, muconic acid, glutonic acid, aconitic acid, and the like.

The amide monomers contemplated for use in the shell polymer of the instant invention are those derived from α,β-olefinically unsaturated carboxylic acids and which have the following structural formula:

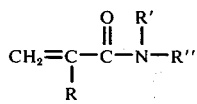

wherein R is hydrogen or an alkyl group containing from 1 to 4 carbon atoms and R' and R'' are hydrogen or a hydrocarbon radical containing from 1 to 12 carbon atoms and preferably an alkyl group containing from 1 to 8 carbon atoms. Examples of amide monomers having the above formula are acrylamide and methacrylamide, N-methyl acrylamide, N-ethyl acrylamide, N-propyl acrylamide, N-(t-butyl)-acrylamide, N-(2-ethylhexyl) acrylamide, N-octyl acrylamide, N-methyl methacrylamide, N-(t-butyl) methacrylamide, N-octyl methacrylamide, N,N-diethyl acrylamide, N,N-diethyl methacrylamide, diacetone acrylamide, and the like.

The N-alkylol and N-alkoxyalkyl derivatives of the olefinically unsaturated amides suitable for use herein are those having the following structural formula:

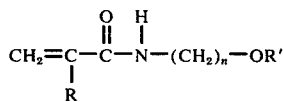

wherein R is hydrogen or an alkyl group containing from 1 to 4 carbon atoms, R' is hydrogen or an alkyl group containing from 1 to 8 carbon atoms and n is an integer from 1 to 4. Examples of amides of the above type include N-methylol acrylamide, N-methylol methacrylamide, N-ethanol acrylamide, N-ethanol methacrylamide, N-propanol acrylamide, N-methoxymethyl acrylamide, N-methoxyethyl acrylamide, N-butoxyethyl acrylamide, N-butoxymethyl methacrylamide, and the like. While the abovementioned monomers are preferred because of their ready availability and low cost, other structurally related polymerizable amides, such as N-methylol maleamide, N-methylol maleimide, N-methylol-p-vinyl benzimide, the hydroxyalkyl derivatives of diacetone acrylamide, and the like, may also be employed.

When making the selection of monomers to be overpolymerized on the vinyl halide core polymer, it is especially advantageous to include acrylic acid or methacrylic acid or esters thereof. The esters most useful in the present invention are those having the following structural formula:

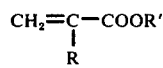

wherein R is hydrogen or a methyl group and R' is an alkyl radical having from 1 to 12 carbon atoms. Examples of such monomers include methyl acrylate, ethyl acrylate, the propyl acrylates and the butyl acrylates, 2-methylhexyl acrylate, n-octyl acrylate, 2-ethylhexyl acrylate, lauryl acrylate, methyl methacrylate, ethyl methacrylate, octyl methacrylate, and the like and derivatives thereof such as ethoxyethyl acrylate. Very often it is desirable to employ the acrylic ester monomer in the vinyl halide core polymer. All the acrylic esters and the acids from which they are derived are copolymerizable with the vinyl halide monomers.

When an alkyl acrylate or an alkyl methacrylate is employed it is often advantageous to use in conjunction therewith minor amounts of one or more other comonomers such as vinyl acetate, acrylonitrile or methacrylonitrile, styrene, and bis (β-chloroethyl) vinyl phosphonate. For example, acrylonitrile is used to obtain polymers which are resistant to solvents. This is important in those cases where the substrate, such as a textile or nonwoven, has to be dry cleaned. The use of bis (β-chloroethyl) vinyl phosphonate is useful if increased flame resistance is desired or necessary. This is an important property where the substrates are to be used in automobile interiors and in textile applications, for example.

The core polymers used in the present invention are prepared in an aqueous medium with a suitable polymerization catalyst employing conventional polymerization techniques. The aqueous medium may be emulsifier free but usually an emulsifier is used. Any of the general types of the anionic and nonionic emulsifiers are suitable. Excellent results are obtained with anionic emulsifiers. Useful anionic emulsifiers include alkali metal or ammonium salts of the sulfates of alcohols having from 8 to 18 carbon atoms such as sodium lauryl sulfate; ethanolamine lauryl sulfate or ethylamine lauryl sulfate; alkali metal and ammonium salts of sulfonated petroleum and paraffin oils; sodium salts of aromatic sulfonic acids, such as the sodium salt of dodecyl benzine sulfuric acid; aralkyl sulfonates; alkali metal and ammonium salts of sulfonates of dicarboxylic acid esters; alkali metal or ammonium salts of free acids of complex organic mono- and diphosphate esters; and the like. Nonionic emulsifiers such as octyl- or nonylphenylpolyethoxyethanol may also be used. Excellent stable polymer latices are obtained when alkali metal and ammonium salts of aromatic sulfonic acids, aralkyl sulfonates and long chain alkyl sulfonates are employed.

When using an emulsifier it is employed in an amount up to about 6% or more by weight based on the total monomer weight. The emulsifier may be added entirely at the outset of the polymerization reaction or it may be charged to the reactor incrementally or by proportioning throughout the reaction. Usually the emulsifier will be mixed with monomer(s) in the premix tank prior to addition to the reactor.

The polymerization reactions are carried out at temperatures ranging from about 5° C. to about 95° C. A compound capable of initiating the reaction is employed, such as a free radical initiator. Suitable compounds for this purpose include the various peroxygen compounds such as persulfates, benzoyl peroxide, t-butyl hydroperoxide, cumene hydroperoxide, t-butyl diperphthalate and the like; azo compounds such as azodiisobutyronitrile and dimethylazodiisobutyrate; and the like. Particularly useful initiators are the water-soluble peroxygen compounds such as hydrogen peroxide and the sodium, potassium and ammonium persulfates. These initiating compounds may be employed either along or in an activated redox system. Typical redox systems include alkali metal persulfates in combination with a reducing substance such as polyhydroxy phenols and oxidizable sulfur compounds such as sodium sulfite, sodium bisulfite, sodium metabisulfite and sodium hydrosulfite, a reducing sugar, dimethylaminopropionitrile, a diazomercapto compound and a water-soluble ferricyanide compound and the like. Heavy metal ions known to activate the persulfate catalyzed polymerization may also be employed. Excellent overpolymerized polymer latices, having the excellent properties to achieve the objective of the present invention, are obtained with persulfate catalyzed polymerizations. The amount of initiator used will generally range between about 0.05% and 3.0% by weight, based on the weight of the total monomers, and preferably will be between about 0.15% and 1.0% by weight.

While the polymerizations may be conducted over a wide range of pH's it is generally preferred that a pH of about 7 or below be maintained. The polymer latices may, subsequent to the overpolymerization, be adjusted to any desired pH by the addition of base. However, it is preferred to keep the polymer latices on the acid side in order to obtain optimum properties in the heat-sealable substrates.

The following general procedure is preferably employed in making the overpolymer latices used in the practice of the present invention. A jacketed polymerization reactor is used which is equipped with an appropriate agitator or stirrer. The reactor is also equipped with an injection device for adding initiators at the beginning and during the reaction. Two monomer premix tanks are employed in conjunction with the reactor and connected thereto, one for premixing the core monomers and the other for premixing the shell monomers.

First the reactor is charged with water and then purged with nitrogen to remove all oxygen therefrom. A portion of the emulsifier to be used, and a portion of the initiator sufficient to initiate the polymerization are added to the reactor. In the first premix tank the monomer premix is made by mixing water, the remaining amount of emulsifier and the vinyl halide monomer(s). The reactor is then heated, if necessary, to a temperature sufficient to initiate the polymerization by circulating heating fluid in the jacket of the reactor. The temperature in the reactor during polymerization will be in range of about 5° C. to about 95° C. Then a portion of the monomer premix is then added to the reactor which is usually about 10% of the total monomer premix although the amount can vary depending upon the monomers employed, the initiator, the temperature of reaction, the particle size desired, etc.

After the initial monomer charge has been allowed to react, with agitation, for a period of time, usually about 15 minutes to 1 hour, the remainder of the monomer premix is proportioned into the reactor, the rate of proportioning being varied depending upon the polymerization temperature, the type of initiator employed and the amount of vinyl halide monomer(s) being polymerized. At the completion of the proportioning a final addition of initiator is made and the polymer latex is heated with agitation for a length of time necessary to insure essentially complete conversion. The percent conversion at this stage will be in the range of about 90% to 99% which is usually reached in about 2 to 6 hours.

In the second premix tank the monomers to be overpolymerized on to the core polymer are mixed with water, emulsifier and initiator. If a different reactor temperature is needed for the overpolymerization reaction it is made prior to the addition of the second monomer premix. The second monomer premix is then proportioned into the reactor. The overpolymerization will take from about ½ to 4 hours. At the completion of the reaction, the reactor is cooled and the overpolymer latex is filtered in order to remove any coagulum formed during the initial polymerization and the overpolymerization.

In the specific examples set out hereinafter the Dielectric Heat Seal (DHS) values are given in ounces. The procedure employed in the examples is one that is used in the automotive industry in making interior paneling and seating material for automobiles. The procedure is designed to determine the bond strength, or seal strength, of dielectrically embossed lines between the trim material and a needled pad or a fibrous pad after oven aging.

The needled or fibrous pad is placed in contact with the trim material which is coated with the overpolymer latex. The sealing is done in a dielectric press using a series of parallel dielectrically heated rule line embossing dies. The bottom of the press is an electrode tray over which are placed two sheets of silicone rubber and one which the "sandwich" of needled pad and trim material are placed to be sealed. Before embossing, however, the trim and pad are conditioned for one hour in an air circulating oven set at 185° F. When the material has cooled it is placed in the press and the embossing die placed thereon. A pressure of 500 lbs./sq. in. is put on the rule lined embossing die, when the voltage is at the proper level to give the desired sealing temperature, for a period of 5 seconds. The embossed assembly is removed from the press and placed in an air circulating oven for 16 hours at 175° F. When using a fibrous pad a time of 4 hours at 185° F. is used.

After the assembly has been removed from the oven and has returned to room temperature, a specimen is cut parallel to and ⅜ inch on each side of a centrally located embossed line along the entire length of the assembly. A hole is punctured at one end of the strip into which the hook of a fish scale, graduated in ounces, is placed. The embossed trim is then peeled back from the pad at a rate of about 1 foot per minute recording the ounces it takes to separate the two. This figure or figures in a measure of the heat seal or bond strength.

The following examples, which are intended to be illustrative and not limitative, are set out to more specifically define the present invention. In the examples all parts and percentages are by weight unless otherwise indicated. In the examples, the "control polymer", used for comparative purposes, was made by copolymerizing vinyl chloride with methyl acrylate using potassium persulfate as a catalyst and the sodium salt of dodecyl benzene sulfuric acid as a dispersing or emulsifying agent. The polymerization reaction was run at a temperature of 114° F. for a period of 27 hours resulting in a total conversion of 97.3%. Thereafter, the resulting copolymer, which contained 80% by weight of vinyl chloride and 20% by weight of methyl acrylate, was plasticized with 35%, by weight of the copolymer, of di-isoctyl phthalate.

EXAMPLE I

Using the procedure, outlined hereinabove, an overpolymer latex was made which contained the following monomers in polymerized form in the percentages indicated:

| Core | Shell | |
|------|-------|---|
| 45% vinyl chloride | 49.5% | ethyl acrylate |
| | 2.8% | acrylonitrile |
| | 1.6% | N-methylol acrylamide |
| | 1.1% | acrylic acid |

The vinyl chloride was polymerized in an aqueous medium at a temperature of 49° C. in the presence of the sodium salt of dodecyl benzene sulfuric acid as an emulsifier and employing 0.2% by weight, based on the weight of the monomer, of potassium persulfate as catalyst or initiator. The reaction was continued for 15 hours with a 95% conversion to polyvinyl chloride. A premix of the shell monomers with water, emulsifier and initiator was added proportionately to the reactor containing polyvinyl chloride and the overpolymerization reaction was carried out for a period of 1 to 2 hours. The overpolymer latex was receoved by filtering from the reaction medium.

Two pieces of auto seating material were prepared, each comprised of a fibrous pad, previously treated with a resinous material in order to strengthen the structure thereof, and having a cloth backing of cotton. Also, two pieces of nylon facing trim material, of the same size as the fibrous pad, were prepared. In one case the facing of nylon was coated on one side with the control polymer latex and in the other case, the facing of nylone was coated on one side with the overpolymer latex of this Example. In each case, the nylon facing was coated with a wire-wound rod to give a coating weight of 2 oz./sq. yd. and then dried at 212° F. When dried, the fibrous pad, in each case, was dielectrically sealed to the nylon facing trim material in accordance with the procedure outlined hereinbefore. Heat seal or bond strength measurements were made with the following results:

the control or standard polymer latex employed for this purpose, even after the seal has been soaked in water for an extended period.

EXAMPLE II

In this Example the overpolymer latices were made in the same manner as outlined in Example I. The control coating in Table II is the same as used in Table I. The overpolymer latex made here contained the following monomers in polymerized form in the percentages indicated:

| Core | Shell | |
|------|-------|---|
| 40% vinyl chloride | 54% | butyl acrylate |
| | 3% | acrylonitrile |
| | 1.8% | N-methylol acrylamide |
| | 1.2% | acrylic acid |

Two pieces of auto seating material were again prepared as in Example I. Two pieces of nylon facing trim material were also prepared as in Example I, except that the nylon facings were coated on one side with a double knife to give a coating weight of 2 oz./sq. yd., one piece being coated with the control polymer latex and the other with the overpolymer latex of this Example, and then dried at 212° F. When dried, the fibrous pad was sealed to the nylon trim material, as in Example I. Heat seal or bond strength measurements were made with the following results:

TABLE II

| | | | BOND STRENGTH IN OUNCES | | | |
|---|---|---|---|---|---|---|
| Coating | Sealing Temp. | Original Seal | After 16 Hrs. at 100° F. and 96% R.H. | Measured at 185° F. After 16 Hrs. at 185° F. | Room Temp. After 16 Hrs. at 185° F. | Room Temp. After 2 Hrs. In Water |
| Control | 313° F. | 2–4 | — | 0–2 | 0–2 | — |
| Ex. II | 300° F. | 24 Tear* | 24 Tear | 14 Tear | 16 Tear | 16 Tear |

*See Table I

Again, as in Example I, it can be seen that the overpolymer latex gives superior dielectric heat seal values to that of the control or standard polymer latex.

As can be seen from the description and specific examples, the articles of the present invention, when sealed using the overpolymers described herein, have superior heat sealing qualities over conventional polymer latices. Further, the overpolymers are internally plasticized thus eliminating the need to externally add a plasticizer, such as di-isooctyl phthalate. When using

TABLE I

| | | | BMD STRENGTH IN OUNCES | | | |
|---|---|---|---|---|---|---|
| Coating | Sealing Temp. | Original Seal | Measured at 185° F. after 16 hrs. at 185° F. | Room Temp. After 16 hrs. at 185° F. | 16 hrs. in Water | 1 hr. in Water |
| Control | 288° F. | 0–2 | 0 | 0 | 0–2 | 0–2 |
| | 313° F. | 2–4 | 0 – 2 | 0 – 2 | 2–4 | 0–2 |
| | 325° F. | 2–4 | 2 – 4 | 2 – 4 | 4–6 | 2–4 |
| Ex. I. | 288° F. | 36 Tear* | 30 Tear | 44 Tear | 6–8 | 8–10 |
| | 313° F. | 48 Tear | 40 Tear | 48 Tear | 8–10 | 10–12 |
| | 325° F. | 48 Tear | 36 Tear | 48 Tear | 10–12 | 10–12 |

*The web or pad tears when the strength of the dielectric heat seal is greater than 30 to 35 ounces, i.e., it tears prior to delamination of the seal.

As can be seen from Table I, the overpolymer latex gives far superior dielectric heat seal values then does di-isoocytl phthalate, for example, ringing or staining o the substrate at the seals occurs. This is eliminate when the overpolymers of the present invention are employed.

Another advantage of the present invention is that it enables manufacturers, and particularly automobile manufacturers, to substitute cheap, fast heat-seals for costly stitching. Further, the overpolymers described herein form more flexible seals than presently used polymer latexes which is important in textile applications, for example. The overpolymers have better color stability than presently used materials which is advantageous in any application.

While the present invention has been described in terms of its specific embodiments, certain modifications and equivalents will be apparent to those skilled in the art and are intended to be included within the scope of the present invention, which is to be limited only by the reasonable scope of the appended claims.

We claim:

1. A heat-sealable article comprising a substrate coated or impregnated with an overpolymer latex containing (1) from about 10% to about 90% by weight of the overpolymer latex of a core polymer of polyvinyl chloride, and (2) from about 90% to about 10% by weight of the overpolymer latex of a shell on said core polymer, said shell being overpolymerized on said core polymer and containing, in polymerized form, one or more polymerizable monomers selected from the group consisting of (a) α,β-olefinically unsaturated carboxylic acids containing from 2 to 12 carbon atoms; (b) amides having the formula

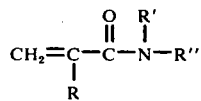

wherein R is hydrogen or an alkyl group containing from 1 to 4 carbon atoms and R' and R" are hydrogen or an alkyl group containing from 1 to 8 carbon atoms; (c) N-alkylol and N-alkoxyalkyl amides having the formula

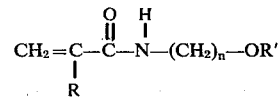

wherein R is hydrogen or an alkyl group containing from 1 to 4 carbon atoms, R' is hydrogen or a hydrocarbon radical containing from 1 to 12 carbon atoms, and n is an integer from 1 to 4; and (d) esters of acrylic acid and methacrylic acid having the formula

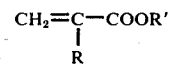

wherein R is hydrogen or a methyl group and R' is an alkyl radical containing from 1 to 12 carbon atoms and wherein said shell contains at least one monomer selected from (c), said heat-sealable article being curable at temperatures substantially below 300° F. without the use of curing agents and being substantially free of discoloration.

2. A heat-sealable article as defined in claim 1 wherein the shell contains polymerizable monomers selected from the groups (a) and (c).

3. A heat-sealable article as defined in claim 1 wherein the shell contains polymerizable monomers selected from the groups (c) and (d).

4. A heat-sealable article as defined in claim 1 wherein the shell is composed of in polymerized form ethyl acrylate, acrylonitrile, N-methylol acrylamide and acrylic acid.

5. A heat-sealable article as defined in claim 1 wherein the substrate comprises a fibrous pad and a synthetic fiber facing material treated with the overpolymer latex and being dielectrically sealed to said fibrous pad.

6. A heat-sealable article as defined in claim 5 wherein the shell is composed of in polymerized form ethyl acrylate, acrylonitrile, N-methylol acrylamide and acrylic acid.

7. A heat-sealable article as defined in claim 5 wherein the fiber facing material is nylon.

8. A heat-sealable article as defined in claim 6 wherein the fiber facing material is nylon.

* * * * *